United States Patent [19]

Danielsen et al.

[11] Patent Number: 4,541,027

[45] Date of Patent: Sep. 10, 1985

[54] METHOD OF FORCE/ACCELERATION REEL TAPE SIZING

[75] Inventors: Kenneth D. Danielsen; Daniel J. Winarski, both of Tucson, Ariz.

[73] Assignee: International Business Machines Corporation, Armonk, N.Y.

[21] Appl. No.: 434,030

[22] Filed: Oct. 13, 1982

[51] Int. Cl.³ .............................................. G11B 15/18
[52] U.S. Cl. ...................................... 360/137; 360/93
[58] Field of Search ........................ 360/137, 72.1–73, 360/90–94, 74.1, 74.2, 74.4, 132, 134, 85; 364/561–562; 377/16–18; 242/75.5, 75.51; 318/6

[56] References Cited

U.S. PATENT DOCUMENTS

3,921,220  11/1975  Primosch et al. ................... 242/72.3
4,157,488   6/1979  Allan ................................. 242/75.51
4,292,509   9/1981  Sato et al. .......................... 242/737
4,366,371  12/1982  d'Alayer de Costemore d'Arc et al. ................................. 242/75.51

Primary Examiner—John H. Wolff
Assistant Examiner—David J. Severin
Attorney, Agent, or Firm—J. A. Pershon

[57] ABSTRACT

The amount of tape wound on the hub of a reel can be determined by the tape drive by using a force/acceleration relationship. An electrical power which provides a certain torque to the motor is applied to the reel drive. The torque imparts a fixed rotational displacement over a fixed period of time. The rotational displacement is measured by a tachometer. The angular acceleration of different inertias results in different rotational displacement over the set period of time which can be used to indicate the amount of tape on the reel since the inertia of the other items, the motor, the clutch and the hub, remains the same.

30 Claims, 4 Drawing Figures

METHOD OF FORCE/ACCELERATION REEL TAPE SIZING

FIELD OF THE INVENTION

This invention relates generally to a dynamic magnetic information storage and retrieval system procedure and more specifically to a method for checking the amount of tape on a reel.

BACKGROUND OF THE INVENTION

It is a well known principle of dynamics that the inertia of a circular body can be determined by applying a known rotational force to the body and measuring the rotational distance traveled by the body, over a fixed period of time. What is new is that this principle of dynamics can be used to determine the amount of magnetic tape placed on a reel enclosed in a cartridge.

The rotational force/acceleration relationship is that the angular acceleration is equal to the torque divided by the rotational inertia. If the rotational body is assumed to be initially at rest and the amount of rotational force is constant with regard to time, then the amount of torque applied to a rotational body will impart a fixed displacement over a fixed period of time. The angular acceleration of different inertias of the different bodies is different, this different angular acceleration will result in different distances traveled by the body during the reference period of time. Therefore, the rotational distance traveled during the application of the torque is in inverse proportion to the inertia of the rotated body.

DESCRIPTION OF THE PRIOR ART

It is known, for instance, to measure the radius of a tape reel in order to determine the amount of torque that should be applied to the reel motors in a reel-to-reel tape drive.

The radius method of determining the amount of tape on a reel in order to set the correct power applied to the motors for correct tape tension can only be calculated with the tape in motion between the two reels of the tape drive. The radius calculation procedure, however, cannot be applied to a single reel cartridge to find the amount of tape on the reel before the tape is threaded through the tape drive.

It is, therefore, an object of the present invention to provide a procedure for determining the amount of tape on a reel without winding the tape onto a second reel in a tape drive.

Another object of the present invention is to use a force/acceleration relationship to determine the amount of tape on a reel that is hidden within a cartridge.

SUMMARY OF THE INVENTION

The present invention uses the force/acceleration relationship of dynamics in order to determine the amount of tape on a reel that is enclosed in a cartridge immediately after the cartridge is inserted into the drive and before the tape is directed to a second reel in the tape drive.

In accordance with the present invention, the method for determining the amount of magnetic tape on a reel comprises the steps of inserting the reel into a tape drive. The inserted reel is then connected to a means for rotating the reel. Since the reel is mounted within a cartridge and therefore the end of the tape is held from entering into the cartridge, a reverse drive in the direction to wind the tape is applied to the reel to insure that the reel is at rest and to take up any loose outer wraps. A forward torque is then applied to the reel for a set period of time. The forward rotational distance traveled by the reel is measured. This forward rotational distance measured is used to determine the amount of tape on the reel and a subsequent reverse motor drive current is set according to the forward rotational distance traveled.

An object of the present invention, therefore, is to provide a process for determining the amount of magnetic tape located on a reel mounted in a cartridge.

In particular, the process for determining the amount of magnetic tape on a reel in a cartridge comprises the steps of inserting the cartridge with the reel into a tape drive and connecting the reel to the drive. A reverse drive is then applied to the reel to take up any loose outer wraps of the tape that could cause an error in the operation. The reel sizing procedure is then entered wherein a timer is loaded such that the procedure operates for a set period of time. A counter is then activated. This counter counts tachometer pulses attached to the reel drive and is therefore an indication of the rotational distance traveled by the reel. A forward drive is then applied to the reel. The timer is incremented and checked to see if the time has expired for applying the forward drive to the reel. After the timer has expired, the information from the tachometer sets a flag as an indication of the amount of tape on the reel and the reel motor is braked to stop any further rotation. A check tension refresh procedure is then entered wherein a low-power reverse drive is applied to the reel to again take up any loose outer wraps which could cause an error in the checking of the tape tension on the reel. The amount of torque applied to the drive is then set according to the determination made as the result of the pulses in the tach counter. The refresh procedure checks for interlayer slip according to the amount of torque applied to the motor. The amount of threading back-torque applied to the motor is likewise determined according to the number of tach pulses in the tach counter. The magnetic tape from the cartridge is then threaded into the tape drive with the correct amount of back torque applied to the tape for a smooth threading operation.

Another object of the invention, therefore, is to provide a procedure that permits the adjusting of the torque applied to a motor for driving a reel of tape located in the cartridge to permit the correct torque to be applied for a check tension refresh procedure and for a tape threading procedure.

These and other objects of the present invention will become apparent to those skilled in the art as the description proceeds.

BRIEF DESCRIPTION OF THE DRAWING

The various novel features of this invention along with the foregoing and other objects, as well as the invention itself both as to its organization and method of operation, may be more fully understood from the following description of illustrated embodiments when read in conjunction with the accompanying drawing wherein.

DESCRIPTION OF THE PREFERRED EMBODIMENT

The procedure of this invention provides the function of testing to determine the amount of tape on a reel. Due to the different circumferences of the reels, the current applied to the file reel motor needs to be modified during the actual loose-wrap test and the drive threading operation. Following the reel sizing test, the motor is driven in the backward direction, in a pulsed mode. The speed control is maintained by a microcode program which increments and decrements the file reel counter based on the number of pulses from the tachometer. This operation is performed in order to remove any tape slack within a cartridge. The current to the file reel motor is monitored for a given threshold value which will occur when the tape slack has been removed due to the absence of tachometer pulses at this point. The loose-wrap test starts when all of the tape slack has been removed. A flag, set by this reel sizing test, indicates the type of cartridge mounted according to the amount of tape on the reel. A back-torque is then applied to the file reel motor according to the amount of tape on the reel.

Figure 1:
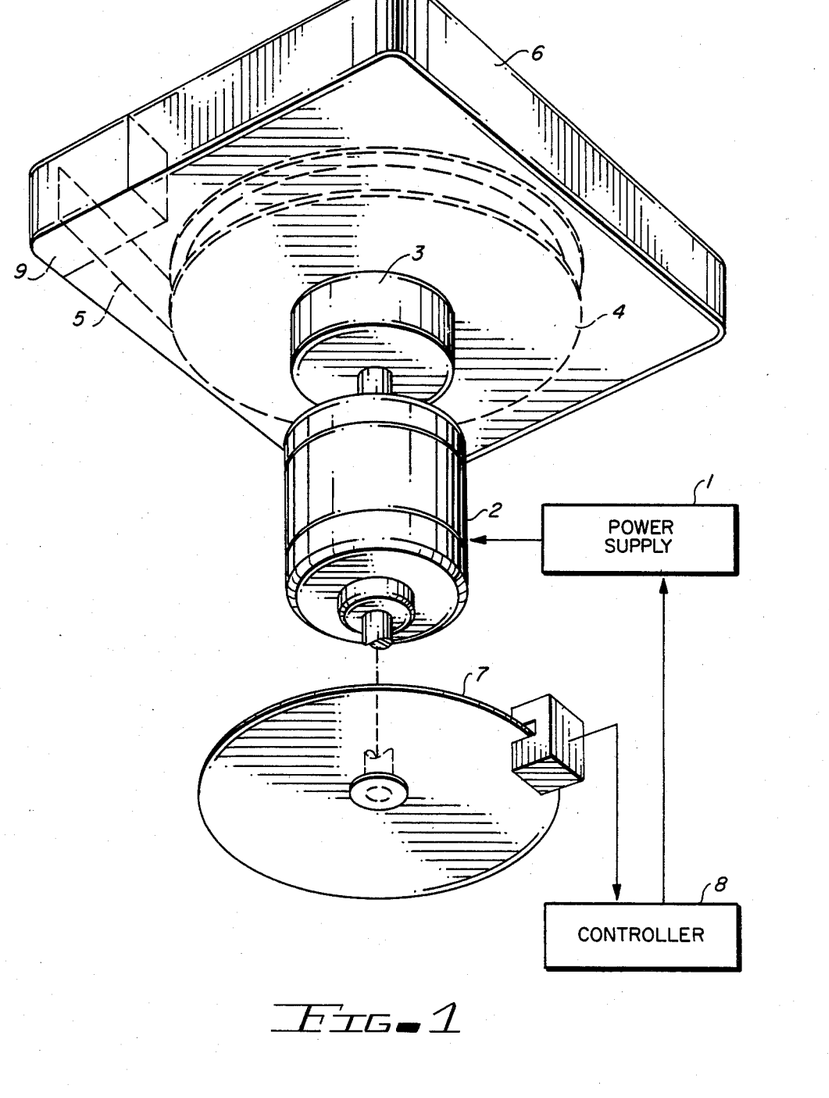
FIG. 1 is an isometric and diagrammatic view of a tape drive for use with the present invention.

The amount of tape wound on the hub of a reel can be determined by using a force/acceleration relationship. A tape drive for use with the present invention is shown in FIG. 1 together with a diagrammatical interconnection with a drive control. An electrical power from a source 1 provides a certain rotational torque to a motor 2. The motor 2, through a clutch 3, rotates a reel 4 containing a plurality of wraps of tape 5 within a cartridge 6. On the opposite end of the motor 2 is mounted a tachometer 7 which emits pulses due to the rotation of the reel 4 by the motor 2. The tachometer pulses are sensed and directed to a controller 8 that is connected to the power source 1 to control the power supplied to the motor 2. A leader block 9 is provided for holding the end of the tape from being pulled into the cartridge and for threading the tape 5 into the tape drive for sensing the information from the tape 5.

The tachometer pulses emitted by the tachometer 7 as a result of the rotation of the reel 4 by the motor 2 are directed to the controller 8 to provide a means whereby the microprocessor can determine the rotational distance traveled by the reel 4. The relationship between the impulse transmitted to the motor 2 by the power source 1 is an indication of the amount of tape 5 that is wound onto the reel 4. A general flow chart showing the procedures for determining the force/acceleration tape reel sizing according to the present invention is shown in FIG. 2.

Figure 2:
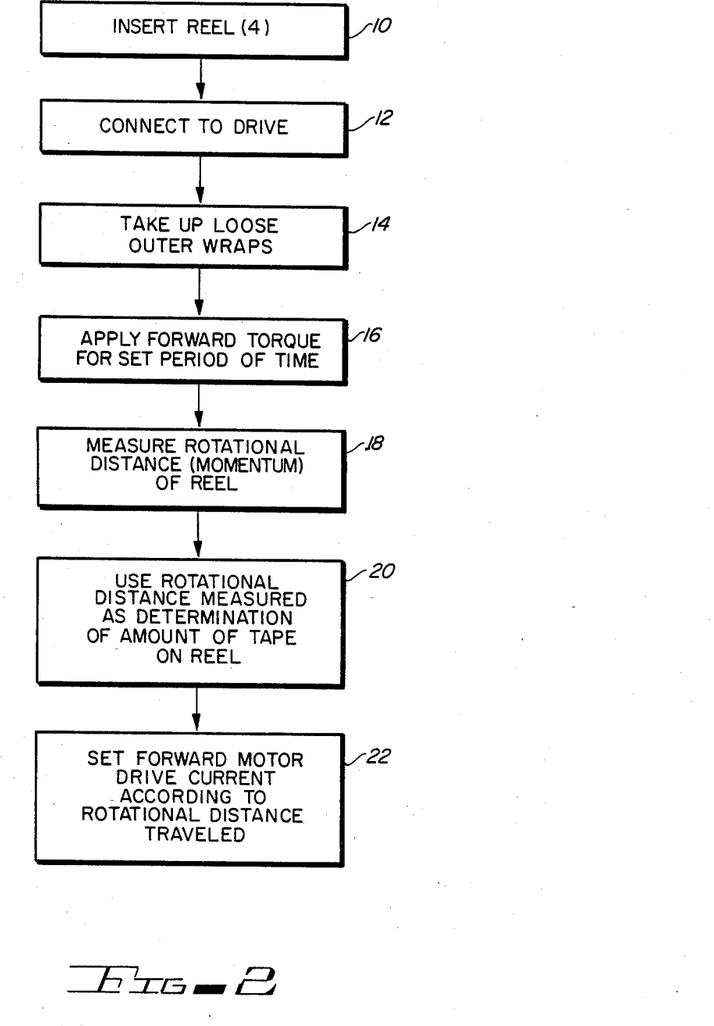
FIG. 2 is a flow diagram of the process adapted to the tape drive of FIG. 1 according to the present invention.

As shown in FIG. 2, the first step in the procedure shown in zone 10 is to insert the reel into the tape drive. In the embodiment show, this is accomplished by entering the cartridge 6, see FIG. 1, into the tape drive. The next step, as shown in zone 12, is to connect the reel 4 to a means for rotating the reel such as the clutch 3 and the drive motor 2 of the tape drive. The first motion when the reel of tape is placed on a reel-to-reel tape drive is to take up the slack in the supply reel thereby insuring that the reel is not rotating. Thus the next procedure, as shown in zone 14, is to take up the loose outer wraps of tape by applying a reverse power to the drive. The differentiation between reels of tape, each containing a different amount of tape, can be determined by using the rotational force/acceleration relationship. The reel is first set at rest. The torque applied to the motor is assumed to be constant with regard to time.

As shown in zone 16, a forward torque is applied to the reel for a set period of time by applying a burst of current to the supply reel motor. This torque imparts a constant angular acceleration to the reel. The associated angular displacement of the reel depends on its inertia, which is a function of the amount of tape that is wound on the reel. Thus, as shown in zone 18, the rotational distance of the reel is measured. The angular displacement is detectable by a tachometer, preferably digital, associated with the supply reel motor. It measures the rotational distance that the reel moved as a result of the power applied to the motor. The power to the motor to supply this torque is applied such that the reel will unwind tape. Therefore, the power is applied for only a very short period of time. The total inertia includes the inertia of the clutch, the motor armature, the reel, as well as the inertia of the tape. The motor, clutch, and reel inertias will essentially remain the same no matter the amount of tape wrapped on the reel. As shown in zone 20, the rotational distance measured is used as a determination of the amount of tape on the reel since the number of digital tachometer pulses emitted is an indication of the rotational distance traveled by the reel and motor; this number is sensed and is directly associated with the amount of tape wrapped on the reel. As shown in zone 22, the forward motor drive current is set according to the rotational distance traveled.

The setting of the forward motor drive current, according to the amount of tape wound on the hub of the reel, is important for two reasons. First, a refresh operation is performed to determine the tape tension of the tape as wound on the reel and second, for the threading operation as the tape is taken from the cartridge reel into the tape drive and onto the reel mounted in the tape drive. In a refresh operation, the motor is driven in the reverse direction against the held end of the tape and the rotational distance traveled is measured. The rotational distance traveled as a result of the force of the drive is a determination of the condition of the tape wraps. The tension in the tape wraps must be of a certain condition for correct operation of a reel-to-reel drive. The amount of stress placed onto the tape is a function of the torque applied to the reel drive motor when the tape is held against a winding motion and the drive is activated in the winding direction. The stress in the tape can become too high and the tape can be stretched or broken if the same torque that is applied to the reel containing many layers of tape is applied to a reel containing only a minimum number of layers of tape. Thus the amount of tape wound on the reel must be determined before the refresh operation is performed in order to set a correct amount of torque to the motor that will check for the correct tape tension without exceeding the stress in the tape which could cause stretching or breakage.

Similarly in a threading operation, a backward drag current is applied to the reel of the cartridge in order to keep the tape taut during the threading operation. Again the amount of stress that can be applied to the tape if a function of the radius of the tape as well as the back current applied to the motor. Thus it is necessary to set the motor drive current according to the amount of tape on the reel before the reel size can be determined by the standard procedures used in a reel-to-reel tape drive.

The standard radius calculation typically done by the drive servo mechanism is able to identify the amount of tape on the reel in a cartridge. However, this can only be done with the tape placed into the drive between the cartridge reel and the drive reel. Thus the standard radius calculation can only be done after the tape is threaded into the drive. This radius calculation cannot be used with all of the tape onto the cartridge reel. As stated previously, the radius of the reel, which is a result of the amount of tape on the reel, needs to be determined before the tape is threaded into the drive in order to set the correct amount of torque applied to the drive for the refresh operation and for the threading operation.

In general, the procedural steps for sensing the inertia of the tape wraps on the reel include the following steps. The reel is first rotated against the held end of the tape to ensure that the reel is not rotating initially. The reel is then rotated in an unwind direction for a set short period of time. The rotational distance is measured during this set period of time. Since the inertia is a function of the amount of tape wrapped on the reel, the rotational distance, which is also a function of the inertia, can be then used as a determination of the amount of tape wraps placed on the reel.

Figure 3:
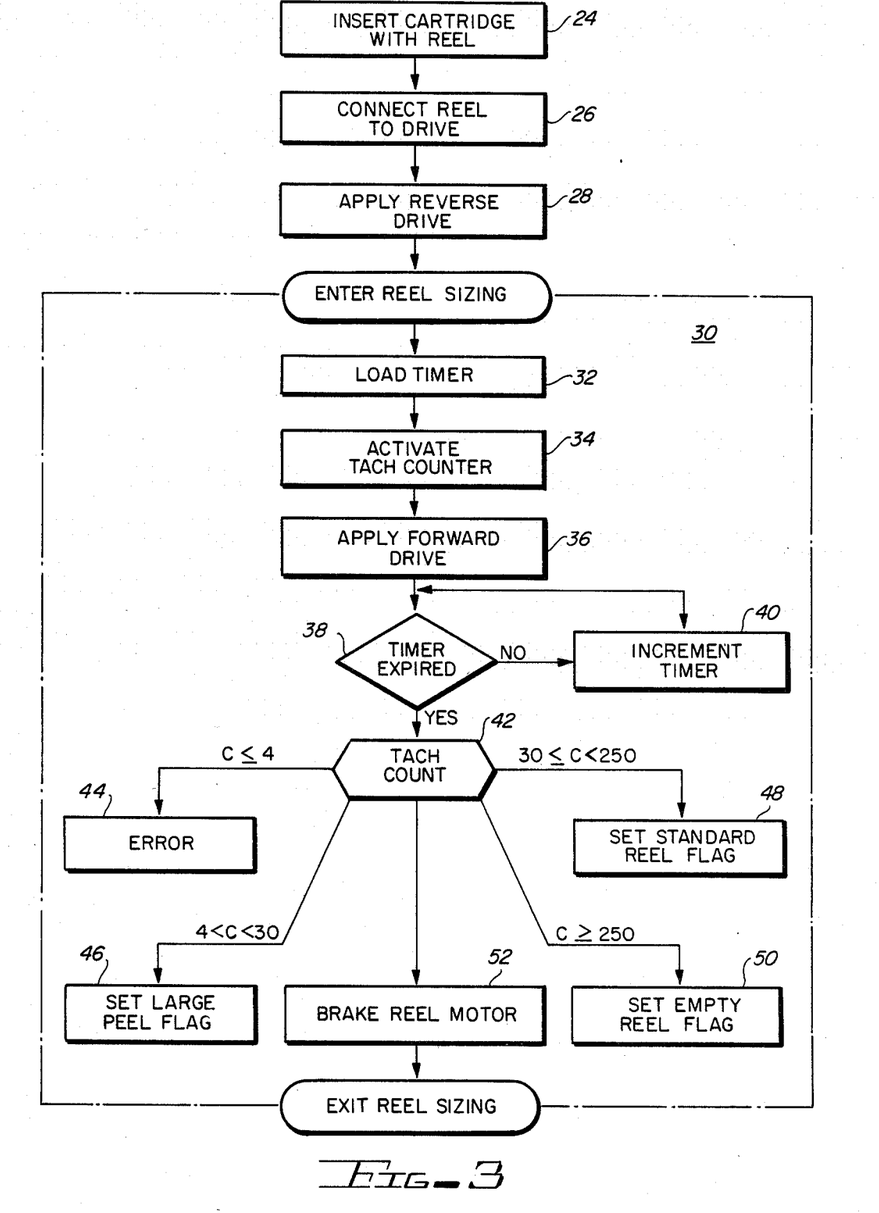
FIG. 3 is a detailed flow of the process as applied to the tape drive of FIG. 1 according to the present invention.

A more specific flow diagram applying the process according to the present invention to a tape drive is shown in FIG. 3. As shown in zone 24, the first step is to insert the cartridge 6 with the reel 4 and tape 5 into a tape drive. The next step, as shown in zone 26, is to connect the reel 4 to the drive motor 2. A reverse drive is then applied by the power source 1, as shown in zone 28. This reverse drive is to take up any loose outer wraps and to ensure that that reel itself is not rotating at that time. The next step in the process is to enter the reel sizing procedure shown within the dotted lines as zone 30. This portion of the procedure is performed in the preferred embodiment by the controller of FIG. 1. The process continues, as shown in zone 32, to load a timer in the controller 8. For the preferred embodiment, the timer is set for 48 milliseconds such that the power applied to the motor is applied for the 48 milliseconds. Thus the set period of time for applying the forward impulse for the preferred embodiment is the 48 milliseconds. The digital tachometer counter of the controller 8 is then activated, as shown in zone 34, in order to set up the counting of the pulses from the tachometer 9 which is a determination of the rotational distance traveled by the reel 4 and motor 2. In zone 36, the forward drive power is applied to the motor 2 by the power source 1 under the control of the controller 8. For the preferred embodiment, 1.36 amps of current is applied to the file reel motor, and the tachometer 9 is a 250 line optical disk.

The next step, continuing in FIG. 3, is a decision zone 38, where the expiration of the timer is checked. As stated previously for zone 32, the timer is set for 48 milliseconds for the preferred embodiment. If the timer has not expired, the "no" decision line is taken to increment the timer as shown in zone 40. The output of the increment timer step 40 returns to the input of the decision block where the timer is checked for expiration. The circular operation to continually increment the timer continues until the timer expires and the "yes" decision line is taken to a zone 42 where the rotational distance is measured by using the number of tachometer pulses counted. If the count "C" is equal to or less than 4, an error condition is set as shown in zone 44. The error condition could be either that there is a problem with the drive motor or the reel cannot freely rotate within the cartridge. An error condition halts any further action with the cartridge. If the count of tachometer pulses is between 4 and 30, the large reel flag is set as shown in zone 46. If the number of pulses in the counter "C" is equal to or greater than 30 and less than 250, a standard reel flag is set as shown in zone 48. If the number of pulses counted is equal to or greater than 250, an empty reel flag is set as shown in zone 40. The empty reel flag may also mean that the motor has been driven for too long a period of time or that an excessive current was applied to the motor. The empty reel flag is generally an indication of a problem in the system. The next step in the procedure after the determination of the tachometer pulses in the counter, as shown in zone 42, is to apply a dynamic brake to the reel motor as shown in zone 52 and then to exit the reel sizing procedure from zone 30. The process flow continues to FIG. 4.

Figure 4:
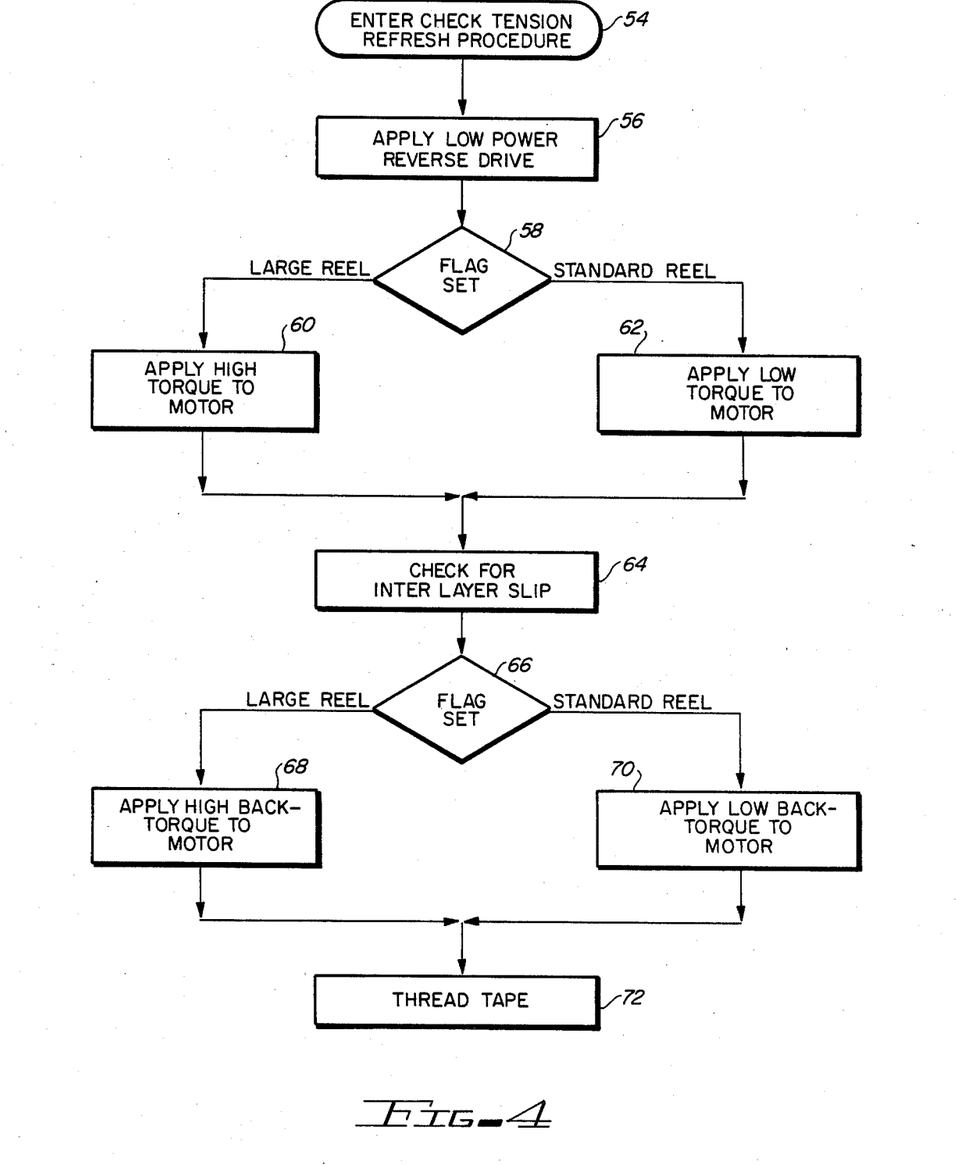
FIG. 4 is a flow diagram showing the use of the process of FIG. 3 in the cartridge tape drive of FIG. 1.

After the amount of tape has been determined in the reel sizing procedure, the next step as shown in zone 54 of FIG. 4 is to enter the procedure that checks the tension of the tape on the reel in order to determine whether a refresh procedure is required. This procedure is also performed in the controller 8 for the preferred embodiment. As stated previously, the refresh procedure for correcting the tension of the tape is necessary only if the cartridge has undergone environmental conditions that could cause the tape to expand and thereby relax the tension and loosen the tightness of the wraps of tape on the reel. A certain tape tension is required for the precision operation in a reel-to-reel tape drive. Thus the need for the check of the tension to see whether a refresh procedure is required. A low-power reverse drive is applied to the reel motor 2 by the power source 1, as shown in zone 56, in order to ensure that no slack occurs between the held end of the tape through the leader block 9 of the cartridge 6 and the outer wrap of tape 5. The leader block 9 in the cartridge 6 is used to thread the tape 5 through the drive. The next step is a decision block 58 where the flags that are set are checked. If the flag set made the determination that a large reel is in the cartridge in the drive, then a high torque is applied to the motor 2 by the power source 1 as shown in zone 60. The high torque according to the preferred procedure is 4.5 amps of current to the motor. If the cartridge contains a standard reel, then as shown in zone 62 a low torque is applied to the motor by applying a current of 2.25 amps. The process flow continues as shown in zone 64 where the check for the inter-layer slip is performed.

The interlayer slip procedure is fully discussed in patent application Ser. No. 315113, filed on Oct. 26, 1981 and titled "Tape Media Interlayer Tension Check", now U.S. Pat. No. 4,389,600, issued June 21, 1983. Reference is made to this patent application for a full discussion of the procedure. For purposes of this application, the procedure checks for the interlayer slip between the layers of tape by applying a set amount of torque to the motor 2 in a reverse direction that is winding the tape 5 onto a reel. The end of the tape 5 is held firmly from entering the cartridge 6 by the leader block 9 and therefore the torque applied to the motor 2 is attempting to turn the reel 4 to tighten the wraps of tape 5 and by this procedure, to check for the correct tension of the wraps of tape on the reel. The rotational distance that the reel 5, and motor 2 travel against the held end of the tape is checked by counting the digital tachometer pulses emitted by the tachometer 7. If the reel travels a rotational distance that has been predetermined to be an indication that this reel needs to be refreshed, the tape is threaded through the system and completely unwound off the cartridge reel onto the machine reel and then rewound back again onto the cartridge reel while the tape is held under the correct tension. This refresh procedure is only performed if the check shows that the tape is loosely wound onto the reel and that interlayer slip occurred. The procedure of the present invention assured that the correct torque was applied to the motor such that this determination could be made without overly stretching the tape or without applying a sufficient current that could show a good reel of tape where interlayer slip should have occurred, if the correct current had been applied to the motor.

After the interlayer slip check procedure as shown in zone 64 is completed, the procedure flows to where the setting of the flags is again checked as shown in zone 66 in order to either apply a high back-torque current to the motor if a large reel is indicated as shown in zone 68 or a low back-torque current should be applied to the motor if a standard reel has been indicated as shown in zone 70. The next step in the procedure, as shown in zone 72, is to thread the tape through the tape drive from the cartridge reel to the machine reel. The correct back current has been applied as a result of the procedure of this present invention and therefore the tape is kept under correct tension during the threading operation. The tape will not sag and thereby not be correctly displaced in the tape drive or be overly stretched by the application of too high of a back torque to the motor attached to the cartridge reel. Too high of a back torque could cause the tape to break or stretch. Further, too high a back current can cause damage to the threading system by forcing the threader to overcome an abnormal load.

The procedure of the present invention determines the amount of tape on the reel by using the rotational force/acceleration relationship. The angular acceleration is equal to the torque divided by the rotational inertia. The reel 4 is assumed to be initially at rest which is assured by the application of the reverse drive power to the motor 2 as shown in zone 28 of FIG. 2. The motor torque is assumed to be constant with respect to time and therefore the simplified force/acceleration relationship becomes a function of the angular rotation. A burst of torque is applied to the supply reel motor for a fixed time. The inertias of different reels varies and therefore the associated angular rotation will be different and thereby detectable. The tachometer 7 measures the rotational distance for a set period of time and thus is a measure of the rotational inertia. The torque power is applied so that the reel 4 begins to unwind the tape 5 and therefore the time that the torque is applied to the motor 2 must be kept very short to prevent an unreeling of the tape 5 from the supply reel 4. In a tape drive, the power source 1 must supply sufficient torque to rotate the reel 4 and the tape 5 within the cartridge 6 as well as the motor armature and the clutch 3 which interconnects the motor 2 to the tape reel 4. This total inertia must be used in the force/acceleration equation. The inertia of the clutch 3 and motor 2 in this embodiment has been found to be 75 micro Kg·m$^2$. Further, in this embodiment the inertia of the reel 4 and the tape media 5 within the cartridge 6 for a small reel has been found to be 80 micro Kg·m$^2$ and for a large reel to be 203 micro Kg·m$^2$. Thus the present invention provides a process for checking the amount of tape contained on a single reel within a cartridge before the tape is threaded through the tape drive to a machine reel.

The principles of the present invention have now been made clear in an illustrated embodiment. There will be immediately obvious to those skilled in the art many modifications of structure, arrangement, proportion, the element, materials and components used in the practice of the invention. For instance, the preferred embodiment shows the procedure and digital tachometer counter pulses used for determining between an empty reel, a standard reel and a large reel. It should be evident that the process could determine between several different sizes of reels by judiciously selecting the number of tachometer pulses required for each and using this count in order to set specific flags that could then adjust the motor current accordingly for each reel. Further, the requirements for the determination of the amount of tape onto the reel before the threading operation is but a preferred reason for performing the reel sizing operation. Other reasons may evolve and the inclusion within the present invention of the requirements of the predetermination of the reel sizing for the checking of the tape tension and the threading of the tape in order to set the current should not limit the present invention. Further, the specific count pulses and the specific current applied for a specific time should not be used to limit the present invention. The appended claims are, therefore, intended to cover the embrace any such modification, within the limits only of the true spirit and scope of the invention.

What is claimed is:

1. In a magnetic tape drive, a method of checking the amount of tape wound on a hub of a reel comprising the steps of:
   holding the free end of the tape wound on the hub;
   rotating the hub in a direction to wind the tape;
   rotating the hub for a predetermined period of time with a predetermined torque in a direction to unwind the tape from the hub;
   determining the rotational distance traveled by the rotated hub in the unwind direction for the set period of time; and
   indicating the amount of tape on the hub as a result of the determined rotational distance traveled for the set period of time due to the inertia of the tape and associated parts.

2. A method of checking the amount of tape wound on a hub of a reel as defined in claim 1 further including the step of setting the motor drive torque for further rotation of the hub as a result of the indicated amount of tape on the hub.

3. The method for operation of a tape drive as defined in claim 1 wherein the tape, the hub and the reel are mounted for rotation within a cartridge.

4. In a magnetic tape drive, a method for checking the length of tape wound on the hub of a reel comprising the steps of:
   inserting the reel containing the tape into the drive;
   holding the free end of the tape wound on the hub;
   rotating the hub in a direction to wind the tape;
   rotating the hub for a predetermined period of time with a predetermined torque in a direction to unwind the tape from the hub;

determining the rotational distance traveled by the rotated hub in the unwind direction for the set period of time; and indicating the amount of tape on the hub as a result of the determined rotational distance traveled due to the inertia of the tape and the associated parts.

5. A method of checking the length of tape wound on a hub of a reel as defined in claim 4 further including the step of setting the motor drive torque for further rotation of the hub as a result of the indicated length of tape on the hub.

6. The method for operation of a tape drive as defined in claim 4 wherein the tape, the hub and the reel are mounted for rotation within a cartridge.

7. In a magnetic tape drive, the method for checking the length of tape wound on the hub of the reel as defined in claim 4 wherein the predetermined period of time for rotating the hub is determined by incrementing or decrementing a timer.

8. In a magnetic tape drive the method for checking the length of tape wound on the hub of the reel as defined in claim 4 wherein the rotational distance traveled is determined by sensing and counting the number of pulses emitted by a tachometer.

9. In a magnetic tape drive, the method for checking the length of tape wound on the hub of the reel as defined in claim 4 wherein the step of indicating the length of tape on the hub is performed by setting a flag which is then sensed by the tape drive.

10. In a magnetic tape drive, a method for checking the length of tape wound on the hub of a reel comprising the steps of:

inserting the reel containing the tape into the drive;
connecting the hub of the inserted reel to a means for rotating the hub;
holding the free end of the tape wound on the hub;
activating the means for rotating the hub in a direction to wind the tape;
then, activating the means for rotating the hub for a predetermined period of time with a predetermined torque in a direction to unwind the tape from the hub;
emitting pulses by a rotational distance measuring means connected to the activated means for rotating the hub;
counting pulses emitted by the rotational distance measuring means as a result of the rotational distance traveled by the rotated hub for the set period of time;
storing the counted pulses;
indicating the length of tape on the hub as a result of the stored counted pulses due to the inertia of the tape and the associated parts; and
setting the torque of the means for rotating the hub for subsequent operations as a result of the indicated length of tape on the hub.

11. The method for operation of a tape drive as defined in claim 10 wherein the tape, the hub and the reel are mounted for rotation within a cartridge.

12. In a magnetic tape drive, a method for checking the length of tape wound on the hub of a reel as defined in claim 10 wherein the rotational distance measuring means is a tachometer connected to the means for rotating the hub which emits electrical pulses as a result of its rotation.

13. In a magnetic tape drive, a method for checking the length of tape wound on the hub of a reel as defined in claim 10 wherein the step of setting the torque of the means for rotation checks a tape tension refresh procedure and further includes the step of setting the backtorque of the means for rotating as a result of the indicated length of tape on the hub and the step of threading the tape from the hub into the tape drive.

14. In a magnetic tape drive, a method of checking the amount of tape wound on a hub of a reel comprising the steps of:

insuring that the hub is not rotating;
rotating the hub for a predetermined period of time with a predetermined torque;
determining the rotational distance traveled by the rotated hub for the set period of time; and
indicating the amount of tape on the hub as a result of the determined rotational distance traveled for the set period of time due to the inertia of the tape and the associated parts.

15. A method of checking the amount of tape wound on a hub of a reel as defined in claim 14 wherein the step of insuring that the hub is not rotating includes the steps of:

holding the free end of the tape wound on the hub; and
rotating the hub in a direction to wind the tape.

16. A method of checking the amount of tape wound on a hub of a reel as defined in claim 14 wherein the step of rotating the hub is performed in a direction to unwind the tape from the hub.

17. A method of checking the amount of tape wound on a hub of a reel as defined in claim 14 further including the step of setting the motor drive torque for further rotation of the hub as a result of the indicated amount of tape on the hub.

18. A method for operation of a tape drive as defined in claim 14 wherein the tape, the hub and the reel are mounted for rotation within a cartridge.

19. In a magnetic tape drive, a method for checking the length of tape wound on the hub of the reel as defined in claim 14 wherein the predetermined period of time for rotating the hub is determined by incrementing or decrementing a timer.

20. In a magnetic tape drive a method for checking the length of tape wound on the hub of the reel as defined in claim 14 wherein the rotational distance traveled is determined by sensing and counting the number of pulses emitted by a tachometer.

21. In a magnetic tape drive, a method for checking the length of tape wound on the hub of the reel as defined in claim 14 wherein the step of indicating the length of tape on the hub is performed by setting a flag which is then sensed by the tape drive.

22. In a magnetic tape drive, a method for checking the length of tape wound on the hub of a reel comprising the steps of:

inserting the reel containing the tape into the drive;
connecting the hub of the inserted reel to a means for rotating the hub;
insuring that the hub is not rotating;
then, activating the means for rotating the hub for a predetermined period of time with a predetermined torque;
emitting pulses by a rotational distance measuring means connected to the activated means for rotating the hub;
counting pulses emitted by the rotational distance measuring means as a result of the rotational distance traveled by the rotated hub for the set period of time;

storing the counted pulses;

indicating the length of tape on the hub as a result of the stored counted pulses due to the inertia of the tape and the associated parts; and setting the torque of the means for rotating the hub for subsequent operations as a result of the indicated length of tape on the hub.

23. A method of checking the amount of tape wound on a hub a reel as defined in claim 22 wherein the step of insuring that the hub is not rotating includes the steps of:

holding the free end of the tape wound on the hub; and rotating the hub in a direction to wind the tape.

24. A method of checking the amount of tape wound on a hub of a reel as defined in claim 22 wherein the step of rotating the hub is performed in a direction to unwind the tape from the hub.

25. A method of checking the amount of tape wound on a hub of a reel as defined in claim 22 further including the step of setting the motor drive torque for further rotation of the hub as a result of the indicated amount of tape on the hub.

26. A method for operation of a tape drive as defined in claim 22 wherein the tape, the hub and the reel are mounted for rotation within a cartridge.

27. In a magnetic tape drive, a method for checking the length of tape wound on the hub of the reel as defined in claim 22 wherein the predetermined period of time for rotating the hub is determined by incrementing or decrementing a timer.

28. In a magnetic tape drive, a method for checking the length of tape wound on the hub of the reel as defined in claim 22 wherein the step of indicating the length of tape on the hub is performed by setting a flag which is then sensed by the tape drive.

29. In a magnetic tape drive, a method for checking the length of tape wound on the hub of a reel as defined in claim 22 wherein the rotational distance measuring means is a tachometer connected to the means for rotating the hub which emits electrical pulses as a result of its rotation.

30. In a magnetic tape drive, a method for checking the length of tape wound on the hub of a reel as defined in claim 22 wherein the step of setting the torque of the means for rotation checks a tape tension refresh procedure and further includes the step of setting the backtorque of the means for rotating as a result of the indicated length of tape on the hub and the step of threading the tape from the hub into the tape drive.

* * * * *